United States Patent
Honda et al.

(10) Patent No.: US 9,666,218 B1
(45) Date of Patent: May 30, 2017

(54) THERMAL ASSISTED MAGNETIC HEAD PROVIDED WITH LIGHT DETECTOR THAT DETECTS REFLECTED LIGHT

(71) Applicant: SAE Magnetics (H.K.) Ltd., Hong Kong (CN)

(72) Inventors: Takashi Honda, Hong Kong (CN); Seiichi Takayama, Hong Kong (CN); Ryuji Fujii, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 15/221,921

(22) Filed: Jul. 28, 2016

(51) Int. Cl.
G11B 11/00 (2006.01)
G11B 7/135 (2012.01)
G11B 5/48 (2006.01)
G11B 5/00 (2006.01)

(52) U.S. Cl.
CPC .... *G11B 5/4866* (2013.01); *G11B 2005/0021* (2013.01)

(58) Field of Classification Search
CPC ............ G11B 11/10554; G11B 11/058; G11B 2005/0021; G11B 5/314; G11B 11/10543; G11B 7/1384; G11B 7/1356; G11B 7/1353
USPC ....... 369/13.13, 13.33, 13.32, 13.02, 112.27, 369/112.21, 112.14, 112.09
See application file for complete search history.

(56) References Cited

U.S. PATENT DOCUMENTS

| | | | |
|---|---|---|---|
| 8,681,594 B1 * | 3/2014 | Shi | G11B 5/6088 369/112.27 |
| 8,687,469 B1 | 4/2014 | Takayama et al. | |
| 9,071,032 B2 | 6/2015 | Nagai | |
| 2013/0068936 A1 | 3/2013 | Nagai | |

FOREIGN PATENT DOCUMENTS

JP 2013-062468 4/2013

* cited by examiner

*Primary Examiner* — Nabil Hindi
(74) *Attorney, Agent, or Firm* — Nixon & Vanderhye PC (57) ABSTRACT

A thermal assisted magnetic recording head has a magnetic head slider and a light source unit that is fixed to the magnetic head slider. A first surface of the light source unit and a second surface of the magnetic head slider face each other via a gap. The light source unit includes a light source that emits laser light from an emission part that is positioned on the first surface and a photodetector that detects the laser light. The magnetic head slider includes a waveguide through which the laser light that is incident on an incident part positioned on the second surface propagates, near-field light generation means for generating near-field light on an air bearing surface, the near-field light being generated from the laser light that propagates through the waveguide, and a recording magnetic pole that is provided adjacent to the near-field light generation means and that has an end part positioned on the air bearing surface. A medium for propagating the laser light is continuously formed along a path that includes the gap and that extends from the emission part to a light receiving surface of the photodetector.

21 Claims, 9 Drawing Sheets

THERMAL ASSISTED MAGNETIC HEAD PROVIDED WITH LIGHT DETECTOR THAT DETECTS REFLECTED LIGHT

BACKGROUND OF THE INVENTION

1. Field of the Invention

The present invention relates to a thermal assisted magnetic recording head provided with a magnetic head slider and a light source unit, and more particularly to a photodetector included in the light source unit.

2. Description of Related Art

There has been necessary to improve the performance of thin-film magnetic heads in connection with increasing the recording density of hard disk apparatuses. A magnetic recording medium is a discontinuous medium consisting of an aggregate of magnetic fine particles each having a single magnetic domain structure. Each recording bit on the magnetic recording medium is composed of a plurality of magnetic fine particles. In order to increase recording density, asperity of the border between adjacent recording bits needs to be reduced. To realize this reduction, the size of the magnetic fine particles needs to be decreased. On the other hand, the magnetization of small, fine particles, namely, magnetic fine particles small in volume, leads to reduced thermal stability. An effective solution to this problem is to increase the anisotropic energy of the magnetic fine particles. However, higher anisotropic energy of magnetic fine particles enhances coercivity of the magnetic recording medium, making it difficult to record information with the existing magnetic head.

So-called thermal assisted magnetic recording is proposed as a method for solving this problem. This method allows the use of magnetic recording medium having high coercivity. When recording information, magnetic field and heat are simultaneously applied to an area of the magnetic recording medium where information is to be recorded, thereby raising the temperature of the area. In the area where coercivity has thus been decreased, the magnetic field enables information to be recorded. Hereinafter, a magnetic head used for thermal assisted magnetic recording will be called a thermal assisted magnetic recording head.

The thermal assisted magnetic recording head disclosed in U.S. Pat. No. 8,687,469 has a magnetic head slider that records information on a magnetic recording medium and a light source unit that is fixed to the magnetic head slider and that supplies laser light to the magnetic head slider. The light source has an edge emitting-type laser diode mounted on a substrate. The edge emitting-type laser diode emits laser light (forward light) from a surface that faces the magnetic head slider, and at the same time, emits laser light (rearward light) from the back surface. The magnetic head slider has near-field light generation means. The near-field light generation means propagates the forward light that is emitted from the light source unit and generates near-field light on the air bearing surface. The near-field light generation means has a waveguide for propagating the forward light and a plasmon generator for generating the near-field light.

The plasmon generator tends to reach high temperatures, causing not only damage to itself but also damage, cracks, etc. to the dielectric body that surrounds the plasmon generator. It is therefore necessary to properly control the output of the forward light. U.S. Pat. No. 8,687,469 and JP2013-62468A disclose a light source unit that has a photodetector on the back surface side of a laser diode. Since the ratio of light intensity between the forward light and the rearward light is previously known, it is possible to control the light intensity of the forward light by measuring the light intensity of the rearward light.

SUMMARY OF THE INVENTION

The photodetectors disclosed in U.S. Pat. No. 8,687,469 and JP2013-62468A are provided on the substrate at a predetermined distance from the laser diode (hereinafter, "light source") in order to detect the rearward light. Thus, the substrate needs to be of a certain size for the light source and the photodetector to be mounted on it in series, and it is difficult to realize a compact light source unit. Accordingly, reducing the weight of the light source unit also becomes difficult. Even if the photodetector is provided on a separate substrate, reducing the weight of the light source is still difficult because another substrate for the photodetector is required. The hard disk apparatus has an arm that rotates in the radial direction of the magnetic recording medium, and the magnetic head slider is mounted at the leading end of the arm. Thus, an increase in the weight of the light source unit has a large impact on the performance of the rotation of the arm.

It is an object of the present invention to provide a thermal assisted magnetic recording head whose size can be easily reduced.

A thermal assisted magnetic recording head has a magnetic head slider and a light source unit that is fixed to the magnetic head slider. A first surface of the light source unit and a second surface of the magnetic head slider face each other via a gap. The light source unit includes a light source that emits laser light from an emission part that is positioned on the first surface and a photodetector that detects the laser light. The magnetic head slider includes a waveguide through which the laser light that is incident on an incident part positioned on the second surface propagates, near-field light generation means for generating near-field light on an air bearing surface, the near-field light being generated from the laser light that propagates through the waveguide, and a recording magnetic pole that is provided adjacent to the near-field light generation means and that has an end part positioned on the air bearing surface. A medium for propagating the laser light is continuously formed along a path that includes the gap and that extends from the emission part to a light receiving surface of the photodetector.

The position of the photodetector is not limited as long as the medium for propagating the laser light is continuously formed along the path that includes the gap and that extends from the emission part to the light receiving surface of the photodetector. Thus, according to the present invention, it is possible to provide a thermal assisted magnetic recording head whose size can be easily reduced.

DETAILED DESCRIPTION OF EMBODIMENTS

First Embodiment

In the specification, direction x means the cross-track direction of magnetic recording medium 14 and corresponds to the radial direction of the magnetic recording medium. Direction y means the direction that is orthogonal to air bearing surface S of the thermal assisted magnetic recording head. Direction z means the down-track direction of magnetic recording medium 14 or the direction that is orthogonal to element-integrated surface 3a of substrate 3 above which a MR (Magneto Resistive) element, a magnetic recording element and so on are formed, and direction z corresponds to the circumferential direction of the magnetic recording medium. Direction z corresponds to film forming direction L in the wafer process. Direction x, direction y and direction z are orthogonal to one another.

Figure 1:
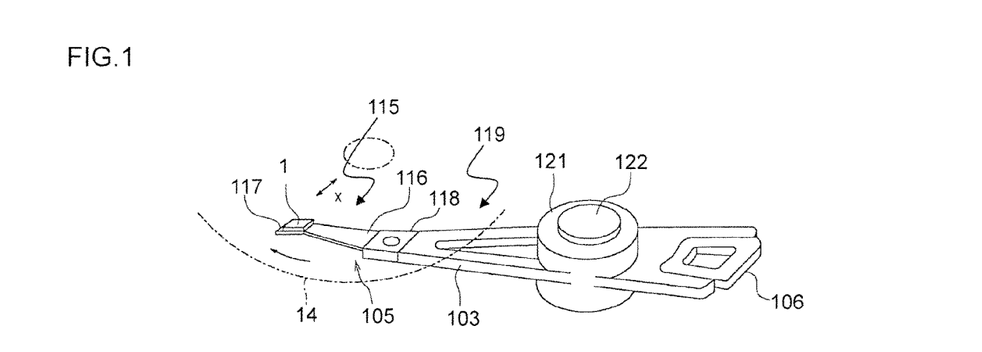
FIG. 1 is a perspective view showing the head arm assembly of a hard disk apparatus.

A thermal assisted magnetic recording head having a light source unit of the present invention is applied to a hard disk apparatus. FIG. 1 is a perspective view showing a head arm assembly of a hard disk apparatus. Head arm assembly 119 has head gimbal assembly 115 and arm 103 on which head gimbal assembly 115 is mounted. Head gimbal assembly 115 includes thermal assisted magnetic recording head 1 and suspension 105 that elastically supports thermal assisted magnetic recording head 1. Suspension 105 has load beam 116 that is formed of stainless steel and that has a flat spring shape, flexure 117 that is provided at one end of load beam 116 and baseplate 118 that is provided at the other end of load beam 116. Thermal assisted magnetic recording head 1 is bonded to flexure 117 and is given a moderate degree of freedom. Baseplate 118 is mounted at one end of arm 103. At the other end of arm 103, coil 106 that constitutes a part of a voice coil motor is mounted. Bearing part 121 is provided at the intermediate part of arm 103. Arm 103 is rotatably supported by shaft 122 that is mounted on bearing part 121 and drives thermal assisted magnetic recording head 1 in cross-track direction x of magnetic recording medium 14.

Figure 2:
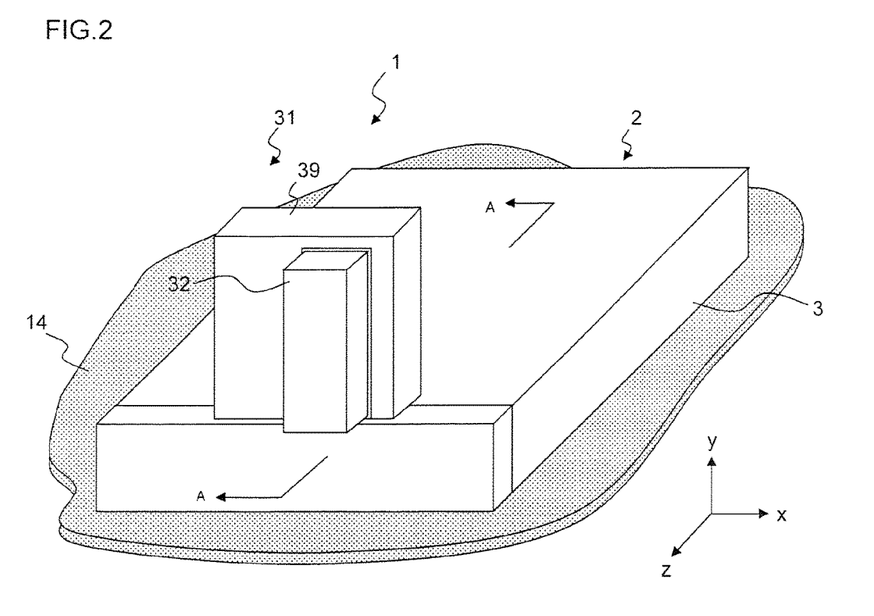
FIG. 2 is a perspective view of a thermal assisted magnetic recording head.
Figure 3:
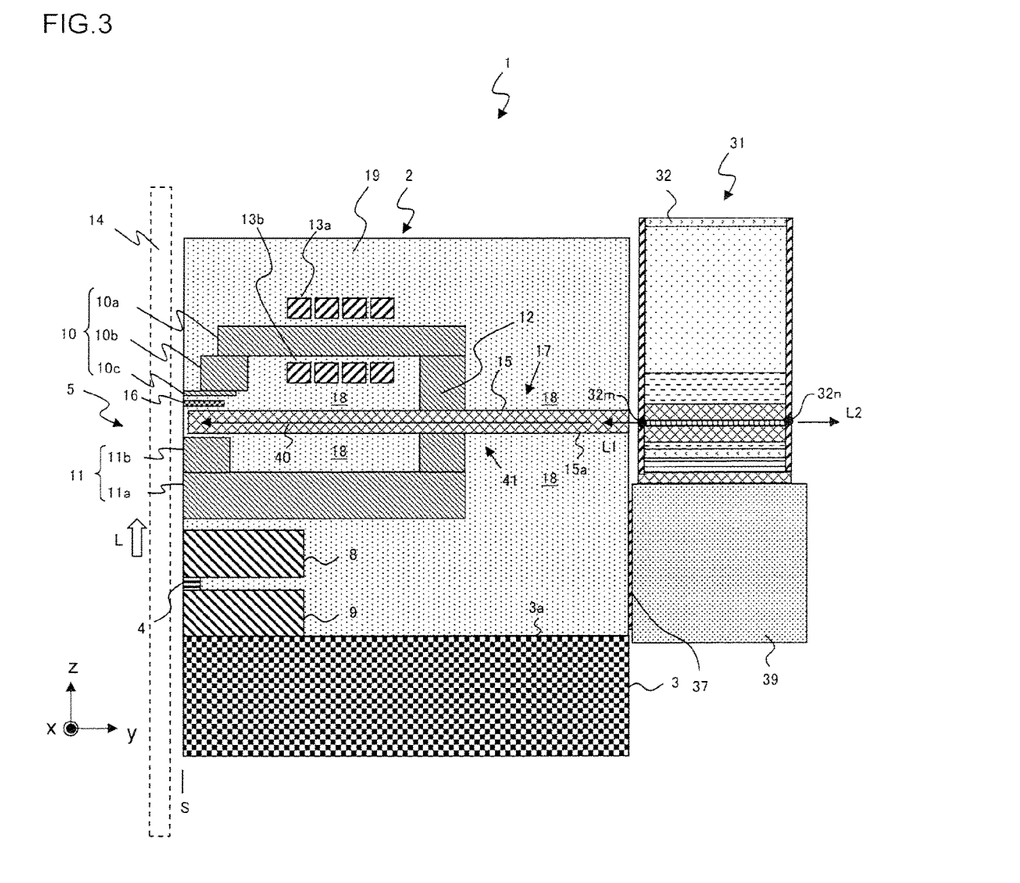
FIG. 3 is a cross-sectional view of the thermal assisted magnetic recording head.
Figure 4:
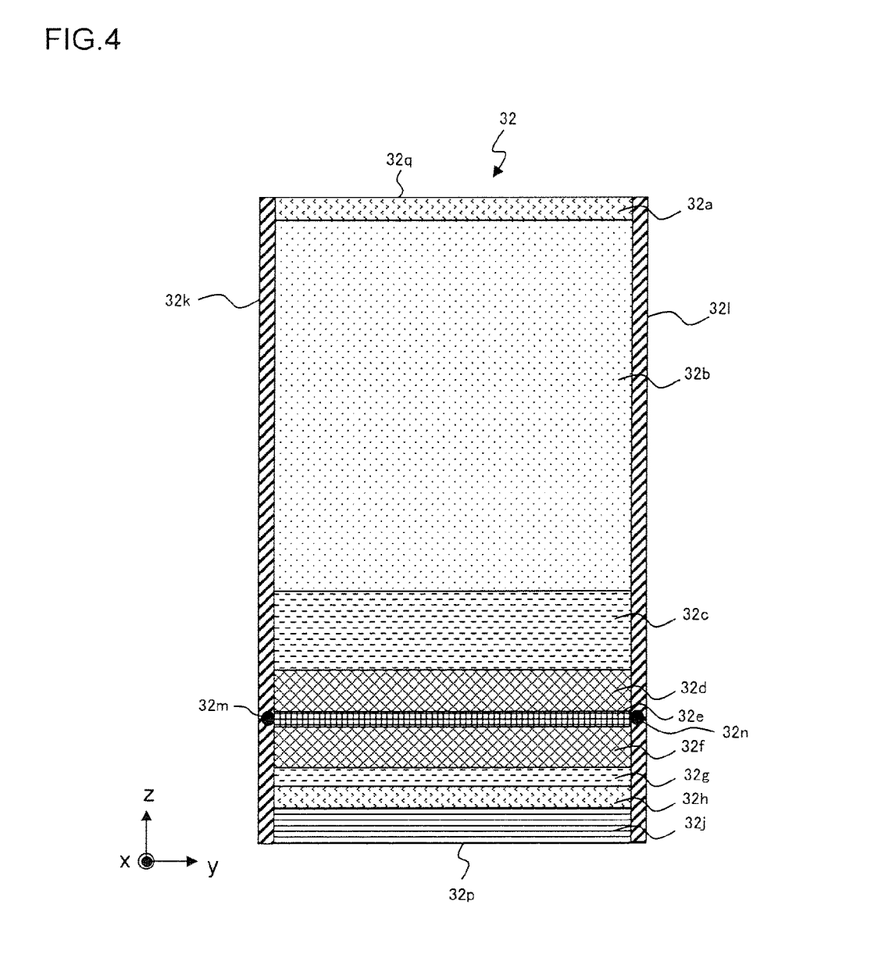
FIG. 4 is a cross-sectional view of a light source (laser diode)

FIG. 2 is an overall perspective view of the thermal assisted magnetic recording head. FIG. 3 is a cross-sectional view of the thermal assisted magnetic recording head cut along line A-A of FIG. 2. FIG. 4 is an enlarged cross-sectional view of the laser diode shown in FIG. 3.

Thermal assisted magnetic recording head 1 has magnetic head slider 2 and light source unit 31 that is fixed to magnetic head slider 2. Magnetic head slider 2 has a substantially hexahedral shape, and one of the surfaces forms air bearing surface S that faces magnetic recording medium 14. Magnetic head slider 2 has MR (Magneto Resistive) element 4, magnetic recording element 5 and near-field light generation means 41. Magnetic recording element 5 includes recording magnetic pole 10 for recording. Near-field light generation means 41 propagates laser light, which is emitted from light source unit 31, in the form of propagating light and generates near-field light on air bearing surface S from the propagating light. Recording magnetic pole 10 is provided adjacent to near-field light generation means 41 and has one end that lies on air bearing surface S. These elements are formed above substrate 3.

Light source unit 31 faces the surface of magnetic head slider 2 that is opposite to air bearing surface S. Light source unit 31 emits laser light in the direction perpendicular to air bearing surface S toward waveguide 17 of magnetic head slider 2. Light source unit 31 is connected to magnetic head slider 2 by means of bonding layer 37.

Magnetic head slider 2 has MR element 4 that has an exposed leading end part located on air bearing surface S. Magnetic head slider 2 has upper shield layer 8 and lower shield layer 9 that sandwich MR element 4 from the upper and lower sides with regard to stacking direction L. These elements configure a reproducing head part. Any configuration that utilizes the magnetoresistive effect may be applied to MR element 4. Such a configuration includes a CIP (Current In Plane)-GMR (Gigantic Magneto Resistive) element in which a sense current flows in the direction (the x-direction) parallel to the film surface, a CPP (Current Perpendicular To Plane)-GMR (Gigantic Magneto Resistive) element in which a sense current flows in the direction (the z-direction) perpendicular to the film surface and a TMR (Tunneling Magneto Resistive) element that utilizes the tunneling effect. In the case where a CPP-GMR element and a TMR element are applied, upper shield layer 8 and lower shield layer 9 are also used as electrodes for supplying a sense current.

Magnetic head slider 2 includes magnetic recording element 5 that constitutes a recording head part. Magnetic recording element 5 is used for so-called perpendicular magnetic recording. Magnetic recording element 5 has magnetic pole 10 for recording. Magnetic pole 10 for recording is provided adjacent to plasmon generator 16, which will be described later. Magnetic pole 10 for recording has first main body part 10a, second main body part 10b and magnetic pole leading end part 10c. These parts are formed, for example, of an alloy that is composed of at least two elements selected from Ni, Fe, and Co. Magnetic pole leading end part 10c, which is the end part of recording magnetic pole 10, lies on air bearing surface S. Return shield layer 11 is provided on the lower side of recording magnetic pole 10 with regard to stacking direction L. Return shield layer 11 has first main body part 11a and second main body part 11b. These parts are also formed, for example, of an alloy that is composed of at least two elements selected from Ni, Fe, and Co.

Recording magnetic pole 10 and return shield layer 11 are magnetically coupled with each other at contact part 12. Overcoat layer 19 composed of $Al_2O_3$ is provided on the upper side of recording magnetic pole 10 with regard to the stacking direction.

Coils 13a, 13b are wound around recording magnetic pole 10 with contact part 12 in the center. FIG. 3 only illustrates the part of the coils that is located on the side of air bearing surface S with regard to contact part 12. A current that is applied from the outside to coils 13a, 13b generates a magnetic flux in recording magnetic pole 10. Coils 13a, 13b are formed of a conductive material, such as Cu.

Magnetic recording medium 14 has a configuration for perpendicular magnetic recording. The magnetic flux released from magnetic pole leading end part 10c enters magnetic recording medium 14 and magnetizes each recording bit in the perpendicular direction. The magnetic flux turns the flux path in the in-plane direction (the z-direction) of magnetic recording medium 14, and further turns the flux path in the perpendicular direction (the y-direction) near return shield layer 11 before being absorbed into return shield layer 11.

Magnetic head slider 2 has near-field light generation means 41 that generates near-field light. Near-field light generation means 41 includes core 15, clad 18 that covers core 15 and plasmon generator 16. Core 15 is able to propagate the laser light, which is generated in light source unit 31, in the form of propagating light 40. Clad 18 has a lower refractive index than core 15. Plasmon generator 16 extends along core 15 to air bearing surface S while facing a part of core 15 and generates near-field light on air bearing surface S. Core 15 extends from the end part of magnetic head slider 2, which faces light source unit 31, to or extends to the vicinity of air bearing surface S. Core 15 and clad 18 constitute waveguide 17.

Core 15 extends between recording magnetic pole 10 and return shield layer 11. While core 15 terminates near air bearing surface S, it may extend to air bearing surface S. Although not shown, clad 18 is provided between core 15 and contact part 12.

Clad 18 may be formed of, for example, $SiO_2$, and core 15 may be formed of, for example, $Al_2O_3$. In the case where clad 18 is formed of $Al_2O_3$, core 15 may be formed of, for example, tantalum oxide ($TaO_x$). $TaO_x$ means any composition of tantalum oxide, which is typically, but not limited to, $Ta_2O_5$, TaO, $TaO_2$, etc.

The laser light generated in light source unit 31 propagates across core 15 in the form of propagating light 40. Thermal assisted magnetic recording head 1 generates near-field light on air bearing surface S by means of near-field light generation means 41, thereby heating an area of magnetic recording medium 14 where information is to be recorded. The following methods may be used as near-field light generation means 41; a method of allowing a plate-like conductive member to directly generate near-field light by the propagating light that propagates across the core; and a method of allowing the illustrated plasmon generator 16 to indirectly generate near-field light. In the following description, an embodiment using plasmon generator 16 will be described.

Plasmon generator 16 extends to air bearing surface S while facing a part of core 15. Plasmon generator 16 is formed of Au, Ag, Cu, Al, Pd, Ru, Pt, Rh, Ir, or an alloy mainly composed of these metals. In this embodiment, plasmon generator 16 is a metal piece having the shape of a substantially square column and a rectangular cross-section. Accordingly, the leading end surface of plasmon generator 16 is rectangular, but it may have another shape, such as a square or a triangle. Of the four side surfaces of plasmon generator 16 that extend in the y-direction, the surface that faces core 15 constitutes a light propagating surface. The light propagating surface couples with propagating light 40 that propagates across core 15 in a surface plasmon mode and thereby generates surface plasmon. The light propagating surface propagates the generated surface plasmon to the leading end surface on the air bearing surface side of plasmon generator 16 and generates near-field light on the leading end surface.

Light source unit 31 includes substrate 39 that is made of silicon and light source 32 that is mounted to substrate 39. Light source 32 is an edge emitting-type laser diode and those commonly used for communication, optical disk storage or material analysis, such as InP, GaAs, and GaN diodes, may be used. The wavelength of the laser light emitted is not particularly limited, but wavelengths within the range of 375 nm to 1.7 μm may be used. As shown in FIGS. A and 4, light source 32 has a generally rectangular parallelepiped shape. Light source 32 has substrate facing surface 32p (lower surface) that faces substrate 39, top surface 32q that is opposite to substrate facing surface 32p. Substrate facing surface 32p of light source 32 has a rectangular shape having a long axis that extends in the light emitting direction of forward light L1.

Light source 32 of one example is configured by sequentially stacking n-electrode 32a, n-GaAs substrate 32b, n-InGaAlP clad layer 32c, first AlGaAs guide layer 32d, active layer 32e composed of a multiple quantum well (GaAs/AlGaAs) etc., second AlGaAs guide layer 32f, p-InGaAlP clad layer 32g, p-electrode seed layer 32h and p-electrode 32j, although the configuration of light source 32 is not limited to the above. First guide layer 32d may be formed of InGaAlP, active layer 32e may be formed of a multiple quantum well of InGaP/InGaAlP, and second guide layer 32f may be formed of InGaAlP. N-electrode 32a may be formed of an approximately 0.1 μm-thick Au or Au alloy layer formed on n-GaAs substrate 32b. Reflection layer (half mirror) 32k is formed on the cleavage surface of light source 32 that faces magnetic head slider 2, and reflection layer (full mirror) 32l is formed on the cleavage surface on the opposite side. The light generated in light source 32 repeats total reflections between reflection layer 32k and reflection layer 32l, reaching a resonance or oscillation state, before it is emitted from reflection layer 32k, which faces magnetic head slider 2, as forward light L1. Part of the light is also emitted from reflection layer 32l as rearward light L2. Thus, the end surface of active layer 32e that faces magnetic head slider 2 constitutes first emission part 32m which emits forward light L1, while the end surface of active layer 32e lying on the opposite side constitutes second emission part 32n that lies on a side opposite to first emission part 32m and that emits rearward light L2. P-electrode seed layer 32h and p-electrode 32j are only formed in a region where first bonding layer 34, described later, is formed so that a part of p-InGaAlP clad layer 32g faces substrate 39 and is exposed to substrate 39.

In this embodiment, light source 32 is mounted to substrate 39 in an orientation in which p-electrode 32j faces substrate 39. This is for the following reasons. Generally, in an edge emitting-type laser diode, active layer 32e lies closer to p-electrode 32j than to n-electrode 32a when viewed in the stacking direction of the light source. Therefore, self-generated heat of light source 32 can be efficiently dissipated by mounting light source 32 to substrate 39 such that the p-electrode, which is closer to active layer 32e that generates the largest heat during operation, is arranged as the bottom surface (junction-down).

Since light source 32 is a semiconductor element, even when the same current is supplied, the light intensity varies widely due to the variation of semiconductor elements. Therefore, it is desirable to determine a current that optimizes the laser light output during initial setting of a hard disk apparatus that incorporates thermal assisted magnetic recording head 1 and to supply the current, determined during the initial setting, to light source 32 in the subsequent operations. In a conventional edge emitting-type laser diode, the intensity of forward light L1 that is emitted from first emission part 32m is evaluated by detecting the intensity of rearward light L2 that is emitted from second emission part 32n. Forward light L1 and rearward light L2 are laser lights in resonance states.

Figure 5A:
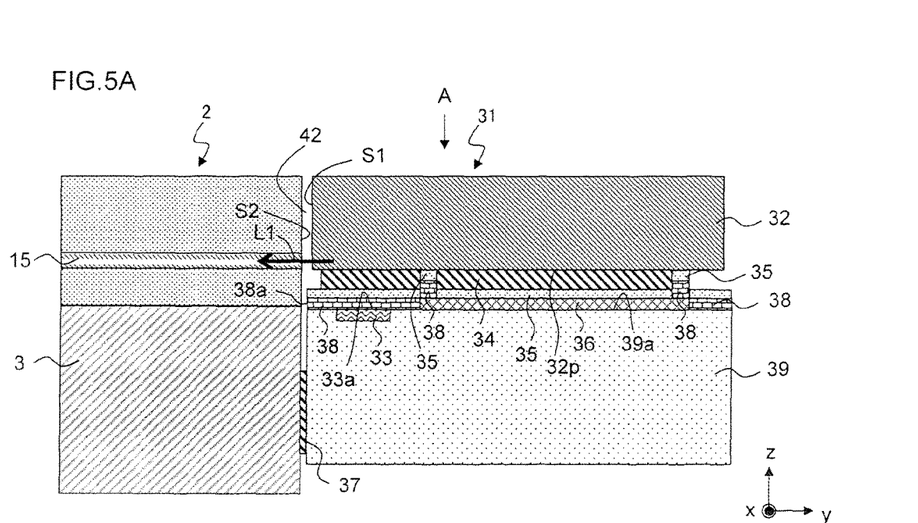
FIG. 5A is a schematic cross-sectional view of the thermal assisted magnetic recording head according to the first embodiment.
Figure 5B:
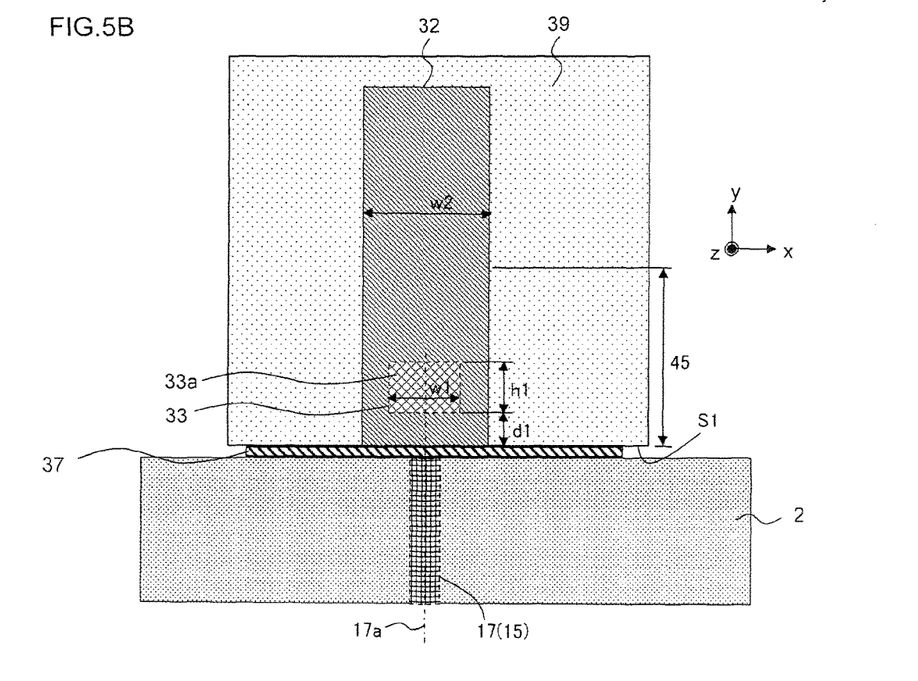
FIG. 5B is a schematic plan view of the thermal assisted magnetic recording head viewed from direction A in FIG. 5A.
Figure 6A:
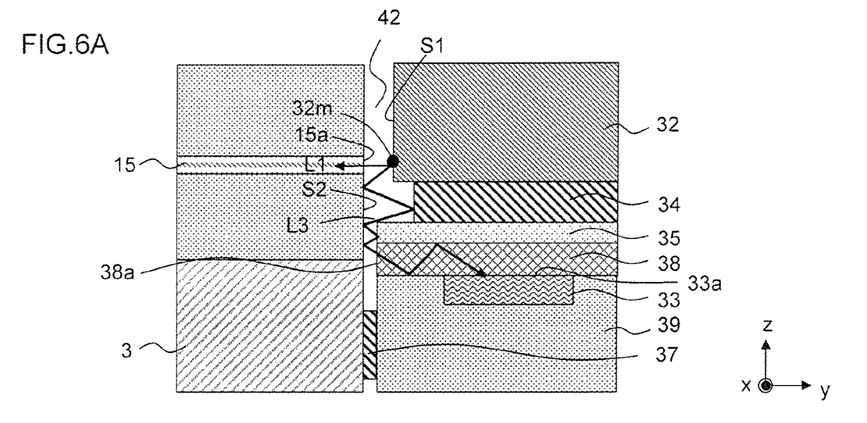
FIG. 6A is a diagram showing the optical path of the first laser light according to the first embodiment.
Figure 6B:
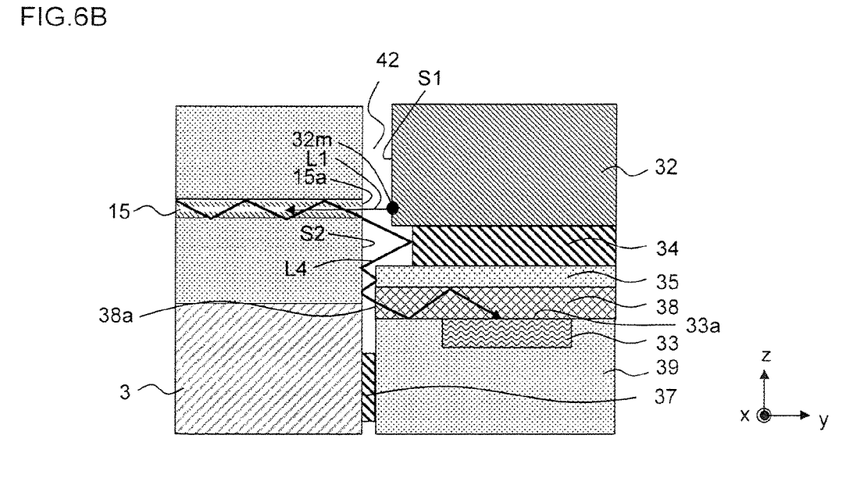
FIG. 6B is a diagram showing the optical path of the second laser light according to the first embodiment.
Figure 6C:
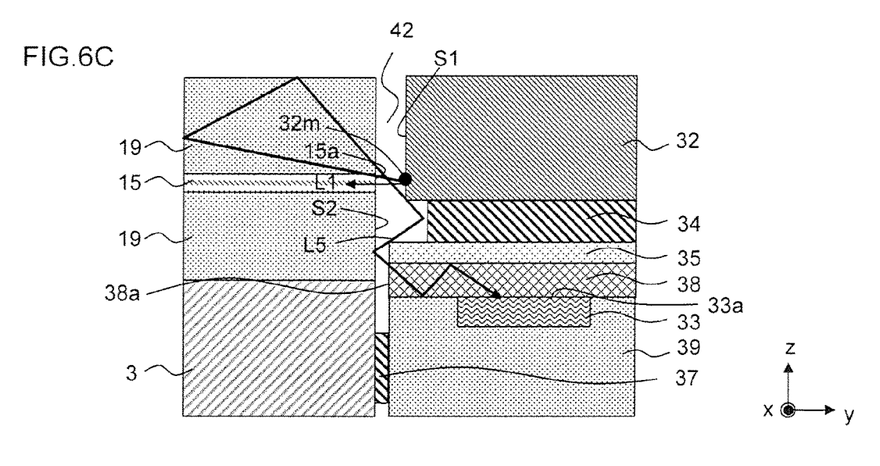
FIG. 6C is a diagram showing the optical path of the third laser light according to the first embodiment.

FIG. 5A is a cross-sectional view of thermal assisted magnetic recording head 1 according to the first embodiment with an enlarged connecting part between light source 32 and substrate 39. FIG. 5B is a plan view showing thermal assisted magnetic recording head 1 viewed from direction A in FIG. 5A. FIGS. 6A to 6C are further enlarged views of the connecting part between light source 32 and substrate 39 with optical paths of laser lights that are incident on photodetector 33 from light source 32. The optical paths of the laser light shown in FIGS. 6A to 6C are merely exemplary, and in reality, many optical paths are present that satisfy the condition in which an angle of incidence is equal to an angle of reflection. Light source unit 31 has first surface S1 which faces magnetic head slider 1 and on which first emission part 32m of the laser light is positioned. Magnetic head slider 1 has second surface S2 that faces first surface S1 via gap 42. Here, first surface S1 means the surface of light source unit 31 that faces magnetic head slider 1 on the side of light source 32 with regard to bonding layer 37. Similarly, second surface S2 means the surface of magnetic head slider 2 that faces light source unit 31 on the side of waveguide 17 with regard to bonding layer 37. Gap 42 means the space or air layer between magnetic head slider 2 and light source unit 31 on the side of light source 32 with regard to bonding layer 37. Incident part 15a of the laser light is positioned on second surface S2, and the laser light incident thereon propagates through core 15 of waveguide 17 in the form of propagating light.

Wiring layer 35, made of Au, is provided on the surface of substrate 39 that faces light source 32, via heat dissipation layer 36 made of Al. Electrically conductive bonding layer 34, made of AuSn, is provided on the surface of wiring layer 35 that faces light source 32. Surface 32p of light source 32 that faces substrate 39, namely, the surface of p-electrode 32j of light source 32, is bonded to wiring layer 35 that is formed on substrate 39, by means of bonding layer 34. Wiring layer 35 is electrically connected to p-electrode 32j of light source 32 via bonding layer 34 and is also electrically connected to a first pad (not shown). Similarly, a second pad (not shown) is provided on the top surface of light source 32, namely, on n-electrode 32a. These pads are connected, by appropriate means such as wire bonding, to electric wirings (not shown) provided in head gimbal assembly 115 that supports thermal assisted magnetic recording head 1. During operations of the hard disk apparatus, power is supplied from a power source in the hard disk apparatus to light source 32 via the first pad and p-electrode 32j, and via the second pad and n-electrode 32a.

Light source unit 31 has photodetector 33 that indirectly detects the intensity of forward light L1. Photodetector 33 is a photodiode. Light receiving surface 33a of photodetector 33 lies on the extension of axis 17a of waveguide 17 (core 15) viewed from the direction that is orthogonal to surface 39a of substrate 39 that faces light source 32, namely, viewed from the down-track direction (the z direction). Preferably, the y-axis of light receiving surface 33a of photodetector 33 lies on the extension of axis 17a. Photodetector 33 is formed on substrate 39, and light receiving surface 33a is formed on the top surface of photodetector 33. Light receiving surface 33a of photodetector 33 is covered with light transmission layer 38 made of SiN. Light transmission layer 38 has the property of transmitting laser light and also works as a protective film for photodetector 33. In the embodiment, a part of heat dissipation layer 36 that covers photodetector 33 is removed after heat dissipation layer 36 is formed on substrate 39, and light transmission layer 38 is formed in the part where heat dissipation layer 36 was removed. Accordingly, light transmission layer 38 is positioned at the same level as heat dissipation layer 36. Heat generated in wiring layer 35 can be transmitted to substrate 39 without being transmitted to photodetector 33 via light transmission layer 38.

Bonding layer 37 is positioned on the side of substrate 39 with regard to end surface 38a of light transmission layer 38 that faces magnetic head slider 1. Accordingly, a gap or air layer 42 is formed between the part of first surface S1 of light source unit 31 on the side of light source 32 with regard to end surface 38a and second surface S2 of magnetic head slider 1. Thus, end surface 38a of light transmission layer 38 is spatially connected to first emission part 32m via gap 42 so that a continuous medium that extends from first emission part 32m to light receiving surface 33a of photodetector 33 is formed. In other words, a medium that allows laser light to propagate therethrough is continuously formed along a path that includes gap 42 and that extends from first emission part 32m to light receiving surface 33a of photodetector 33. The term "medium" mean a substance or an object through which wave motion, particularly laser light, propagates, and in the embodiment, the medium consists of air layer 42, positioned between first surface S1 and second surface S2, and light transmission layer 38, although not limited to these. For example, the entire medium may be made of light transmission layer 38 or of an air layer.

Photodetector 33 detects laser light that is reflected on second surface S2 of magnetic head slider 1 (this laser light is referred to as first laser light L3). Referring to FIG. 6A, a part of the laser light is incident and reflected on second surface S2 of magnetic head slider 1 due to its diffusion characteristics. A part of first laser light L3 reflected on second surface S2 is laser light that is reflected on incident part 15a of core 15, and the remaining laser light is reflected on second surface S2 except incident part 15a. First laser light L3, that was reflected, passes through gap 42 between bonding layer 34 and second surface S2 while being reflected between magnetic head slider 1 and light source unit 31, and is incident on light transmission layer 38 from end surface 38a thereof. Since light transmission layer 38 has a higher refractive index than wiring layer 35 and substrate 39, first laser light L3 propagates within light transmission layer 38 while being repeatedly reflected on the interface of light transmission layer 38 with wiring layer 35 and on the interface thereof with substrate 39, and is incident on photodetector 33 from light receiving surface 33a.

Further, photodetector 33 is able to detect laser light that returns to gap 42 through incident part 15a after being reflected within waveguide 17 (this laser light is referred to as second laser light L4). As shown in FIG. 6B, the second laser light that is incident on waveguide 15 propagates within core 15, is then reflected at the end of core 15 that is opposite to incident part 15a, propagates in the opposite direction toward incident part 15a and is emitted to gap 42 through incident part 15a. A part of the laser light passes through core 15, reaches magnetic recording medium 14, is then reflected on magnetic recording medium 14, propagates through core 15 in the opposite direction, and is emitted to gap 42 through incident part 15a. Second laser light L4 then propagates along a path similar to that of first laser light L3 and is incident on photodetector 33 from light receiving surface 33a. In the embodiment, first laser light L3 is mainly detected, but second laser light L4 is also detected by photodetector 33.

In addition, photodetector 33 is able to detect laser light that returns to gap 42 from second surface S2 after being reflected inside overcoat layer 19, made of $Al_2O_3$ (this laser light is referred to as third laser light L5). As shown in FIG. 6C, the third laser light that is incident on overcoat layer 19 propagates within overcoat layer 19, is then reflected on the end of overcoat layer 19 that is opposite to second surface S2, as well as on magnetic recording medium 14, propagates in the opposite direction toward second surface S2 and is emitted to gap 42 through second surface S2. Third laser light L5 then propagates along a path similar to that of first laser light L3 and is incident on photodetector 33 from light receiving surface 33a. In the embodiment, first laser light L3 is mainly detected, but third laser light L5 is also detected by photodetector 33.

Thus, according to the embodiment, the intensity of forward light L1 can be detected in the form of the reflected light or the return light from core 15. Therefore, photodetector 33 is different from the conventional technology in which rearward light L2 is detected in that it does not have to be provided behind light source 32, viewed from magnetic head slider 1. Instead, photodetector 33 can be arranged such that it overlaps with light source 32 in the vertical direction (the z direction). The y-direction length of substrate 39 of light source unit 31 can be substantially defined by the length of light source 32, and therefore the y-direction length of entire magnetic head slider 1 can be reduced. This leads to reduction not only in the size of magnetic head slider 1 but also in weight thereof, thus reducing any effect on the rotation performance of the arm of the hard disk apparatus.

FIG. 5B shows preferable positions and the sizes of light receiving surface 33a of photodetector 33. Width w1 of light receiving surface 33a of photodetector 33 in the direction that is parallel both to surface 39a of substrate 39 that faces light source 32 and first surface S1, namely, in the cross-track direction (the x direction), is preferably one fourth or more of width w2 of light source 32 in the x direction. At least a part of light receiving surface 33a of photodetector 33 is preferably provided between first surface S1 of light source 32 and the middle of the total length of light source 32 (range 45 in the figure) in the direction that is orthogonal to first surface S1 (the y direction). Length h1 of light receiving surface 33a of photodetector 33 in the direction that is orthogonal to first surface S1 (the y direction) is preferably not less than distance d1 between first surface S1 and the light receiving surface. When at least one of these conditions is satisfied, detection of first laser light L3 and second laser light L4 can be further facilitated.

Second Embodiment

Figure 7A:
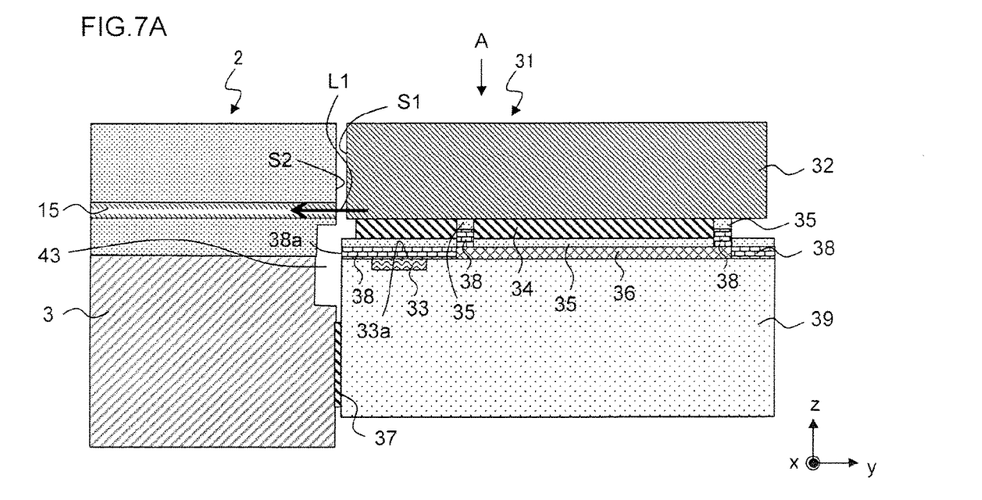
FIG. 7A is a schematic cross-sectional view of the thermal assisted magnetic recording head according to the second embodiment.
Figure 7B:
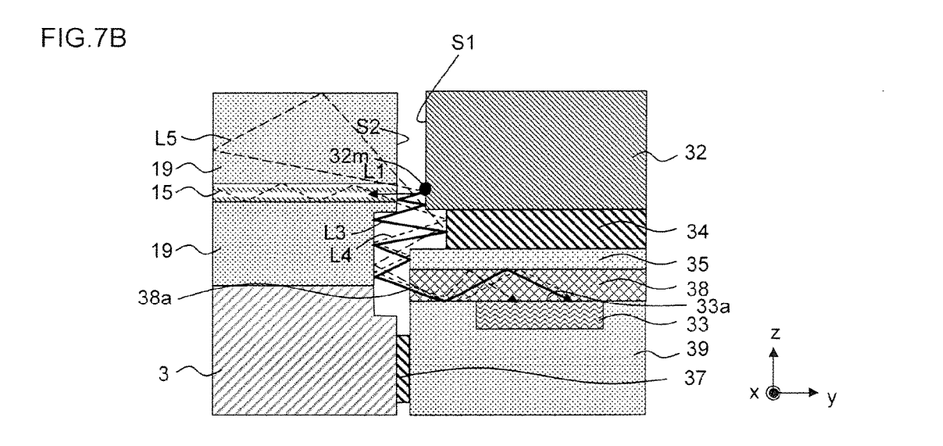
FIG. 7B is an enlarged view of the connection part between the magnetic head slider and the light source unit shown in FIG. 7A.

FIG. 7A shows a cross-sectional view of thermal assisted magnetic recording head 1 according to the second embodiment, and FIG. 7B shows the optical paths of first and second laser lights L3 and L4. As in the case of FIGS. 6A to 6C, the optical paths of the laser light shown in FIG. 7B are merely exemplary, and in reality, many optical paths are present that satisfy the condition in which an angle of incidence is equal to an angle of reflection. This embodiment is the same as the first embodiment except that recess 43 is provided on a part of second surface S2 that faces end surface 38a of light transmission layer 38. Recess 43 has preferably a depth (the y-direction size) of 1 to 3 µm, and more preferably about 2 µm. Recess 43 increases optical paths of first laser light L3 that is reflected on second surface S2 of magnetic head slider 1 and that is incident on end surface 38a of light transmission layer 38. In addition, the laser light reaches end surface 38a of light transmission layer 38 with a smaller number of reflections, and the energy loss that accompanies the reflections is reduced. As a result, a larger amount of laser light can be detected by photodetector 33. In particular, second laser light L4 can be detected more efficiently in this embodiment.

Third Embodiment

Figure 8A:
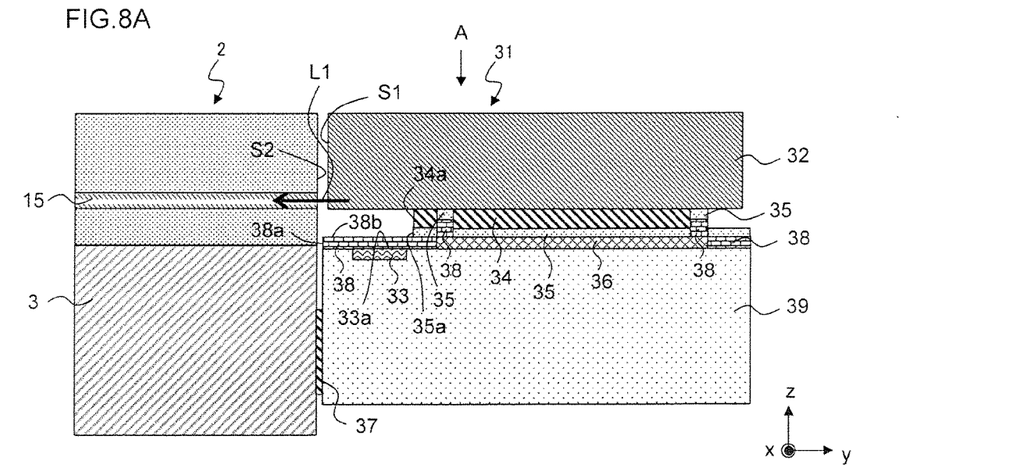
FIG. 8A is a schematic cross-sectional view of the thermal assisted magnetic recording head according to the third embodiment.
Figure 8B:
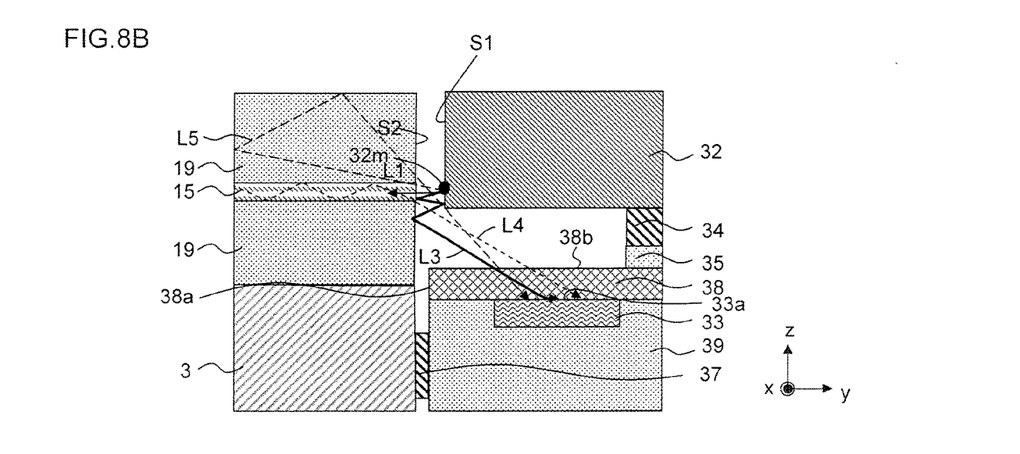
FIG. 8B is an enlarged view of the connection part between the magnetic head slider and the light source unit shown in FIG. 8A.

FIG. 8A shows a cross-sectional view of thermal assisted magnetic recording head 1 according to the third embodiment, and FIG. 8B shows the optical paths of first and second laser lights L3 and L4. As in the case of FIGS. 6A to 6C, the optical paths of the laser light shown in FIG. 8B are merely exemplary, and in reality, many optical paths are present that satisfy the condition in which an angle of incidence is equal to an angle of reflection. This embodiment is the same as the first embodiment except that the entire light receiving surface 33a of photodetector 33 is exposed to the air layer via light transmission layer 38. Specifically, surfaces 34a and 35a of bonding layer 34 and wiring layer 35 that face magnetic head slider 1 are positioned further away from magnetic head slider 1 than facing surface 38a of light transmission layer 38, and light transmission layer 38 is not covered with bonding layer 34 and wiring layer 35. As a result, the laser light can be efficiently incident on surface 38b. First and second laser lights L3 and L4 are incident on light transmission layer 38 along a larger number of optical paths, and first and second laser lights L3 and L4 reach surface 38b with a smaller number of refractions. Thus, photodetector 33 is able to detect first and second laser lights L3 and L4 more efficiently. In particular, second laser light L4 can be detected more efficiently in this embodiment. Although not illustrated, light receiving surface 33a of photodetector 33 may be only partially exposed to the air layer via light transmission layer 38.

Fourth Embodiment

Figure 9A:
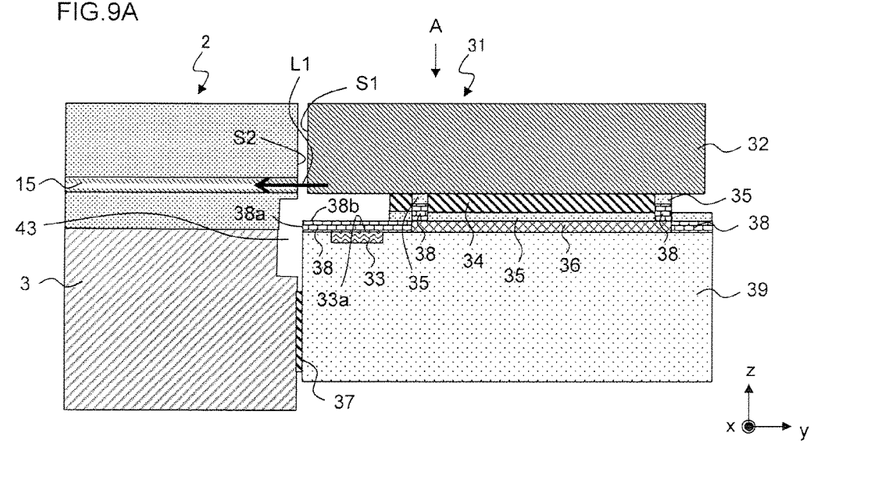
FIG. 9A is a schematic cross-sectional view of the thermal assisted magnetic recording head according to the fourth embodiment.
Figure 9B:
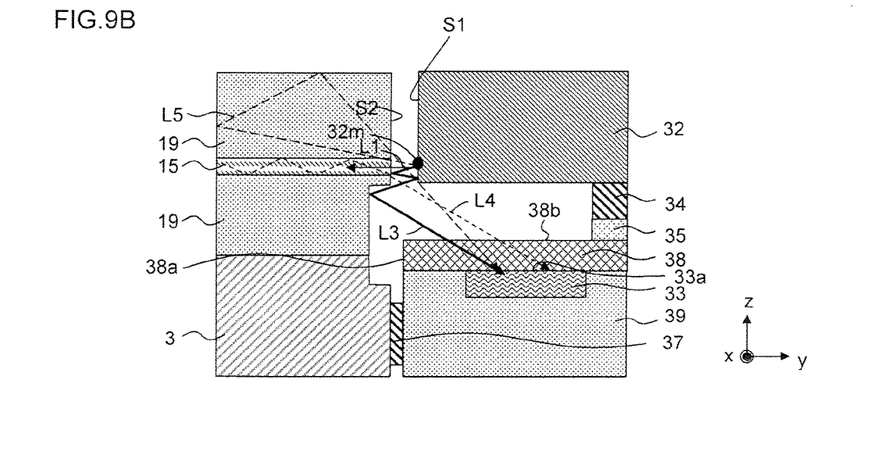
FIG. 9B is an enlarged view of the connection part between the magnetic head slider and the light source unit shown in FIG. 9A.

FIG. 9A shows a cross-sectional view of thermal assisted magnetic recording head 1 according to the fourth embodiment, and FIG. 9B shows the optical paths of first and second laser lights L3 and L4. As in the case of FIGS. 6A to 6C, the optical paths of the laser light shown in FIG. 9B are merely exemplary, and in reality, many optical paths are present that satisfy the condition in which an angle of incidence is equal to an angle of reflection. The embodiment has both the features of the second embodiment and the features of the third embodiment. Specifically, second surface S2 has recess 43 on a part thereof that faces end surface 38a of light transmission layer 38, and at least a part of light receiving surface 33a of photodetector 33 is exposed to the air layer via light transmission layer 38. For each feature, refer to the descriptions of the second embodiment and the third embodiment. First and second laser light L3 and L4 can be detected more efficiently in this embodiment.

What is claimed is:

1. A thermal assisted magnetic recording head, comprising:
    a magnetic head slider and a light source unit that is fixed to the magnetic head slider, a first surface of the light source unit and a second surface of the magnetic head slider facing each other via a gap, wherein:
    the light source unit includes a light source that emits laser light from an emission part that is positioned on the first surface, and a photodetector that detects the laser light;
    the magnetic head slider includes:
        a waveguide through which the laser light that is incident on an incident part positioned on the second surface propagates,
        near-field light generation means for generating near-field light on an air bearing surface, the near-field light being generated from the laser light that propagates through the waveguide, and
        a recording magnetic pole that is provided adjacent to the near-field light generation means and that has an end part positioned on the air bearing surface,
    a medium for propagating the laser light is continuously formed along a path that includes the gap and that extends from the emission part to a light receiving surface of the photodetector.

2. The thermal assisted magnetic recording head according to claim 1, wherein the photodetector detects the laser light that is reflected on the second surface.

3. A thermal assisted magnetic recording head, comprising:
    a magnetic head slider and a light source unit that is fixed to the magnetic head slider, a first surface of the light source unit and a second surface of the magnetic head slider facing each other via a gap, wherein:
    the light source unit includes a light source that emits laser light from an emission part that is positioned on the first surface, and a photodetector that detects the laser light;
    the magnetic head slider includes:
        a waveguide through which the laser light that is incident on an incident part positioned on the second surface propagates,
        near-field light generation means for generating near-field light on an air bearing surface, the near-field light being generated from the laser light that propagates through the waveguide, and
        a recording magnetic pole that is provided adjacent to the near-field light generation means and that has an end part positioned on the air bearing surface, and
        a recording magnetic pole that is provided adjacent to the near-field light generation means and that has an end part positioned on the air bearing surface, and
    the photodetector detects the laser light that is reflected on the second surface.

4. The thermal assisted magnetic recording head according to claim 1, wherein the light source unit includes a light transmission layer that covers the photodetector and that works as the medium.

5. The thermal assisted magnetic recording head according to claim 4, wherein the light transmission layer is made of SiN.

6. The thermal assisted magnetic recording head according to claim 4, wherein an end surface of the light transmission layer that faces the magnetic head slider faces the gap.

7. The thermal assisted magnetic recording head according to claim 6, wherein the second surface has a recess on a part thereof that faces the end surface of the light transmission layer.

8. The thermal assisted magnetic recording head according to claim 7, wherein a depth of the recess is 1 to 3 μm.

9. The thermal assisted magnetic recording head according to claim 4, wherein at least a part of a surface of the light transmission layer that faces the light source is exposed via the light transmission layer.

10. The thermal assisted magnetic recording head according to claim 4, wherein the second surface has a recess on a part thereof that faces the end surface of the light transmission layer, and at least a part of a surface of the light transmission layer that faces the light source is exposed via the light transmission layer.

11. The thermal assisted magnetic recording head according to claim 1, wherein the medium includes a light transmission layer that covers the photodetector and that works as the medium, and an air layer that is formed in the gap.

12. The thermal assisted magnetic recording head according to claim 1, wherein the light receiving surface of the photodetector is provided between the first surface and a middle of a total length of the light source in a direction that is orthogonal to the first surface.

13. The thermal assisted magnetic recording head according to claim 1, wherein the photodetector detects the laser light that returns from the incident part after being reflected inside the waveguide.

14. The thermal assisted magnetic recording head according to claim 1, wherein:
    the magnetic head slider includes an overcoat layer, made of $Al_2O_3$, that covers the waveguide, the near-field light generation means and the recording magnetic pole; and
    the photodetector detects the laser light that returns from the second surface after being reflected inside the overcoat layer.

15. The thermal assisted magnetic recording head according to claim 1, wherein a width of the light receiving surface of the photodetector in a cross-track direction is one fourth or more of a width of the light source in the cross-track direction.

16. The thermal assisted magnetic recording head according to claim 1, wherein a length of the light receiving surface of the photodetector in a direction that is orthogonal to the first surface is not less than a distance between the first surface and the light receiving surface.

17. The thermal assisted magnetic recording head according to claim 1, wherein the light receiving surface of the photodetector lies on an axis of the waveguide when viewed from a down-track direction.

18. A light source unit that is fixed to a magnetic head slider, comprising:
    a light source that emits laser light from an emission part that is positioned on a first surface, the first surface facing the magnetic head slider via a gap;
    a photodetector that detects the laser light; and
    a light transmission layer which covers the photodetector and through which the laser light propagates,
    wherein the light transmission layer is continuously formed from the first surface to a light receiving surface of the photodetector.

19. The light source unit according to claim 18, wherein the light receiving surface of the photodetector is provided between the first surface and a middle of a total length of the light source in a direction that is orthogonal to the first surface.

20. The light source unit according to claim 18, wherein a width of the light receiving surface of the photodetector in a cross-track direction is one fourth or more of a width of the light source in the cross-track direction.

21. The light source unit according to claim 18, wherein a length of the light receiving surface of the photodetector in a direction that is orthogonal to the first surface is not less than a distance between the first surface and the light receiving surface.

* * * * *